(12) United States Patent
Naganawa et al.

(10) Patent No.: US 8,424,907 B2
(45) Date of Patent: Apr. 23, 2013

(54) AIRBAG APPARATUS

(75) Inventors: Akitoshi Naganawa, Kiyosu (JP);
Naohiko Ishiguro, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/343,062

(22) Filed: Jan. 4, 2012

(65) Prior Publication Data

US 2012/0193900 A1 Aug. 2, 2012

(30) Foreign Application Priority Data

Jan. 28, 2011 (JP) ................................. 2011-016635

(51) Int. Cl.
*B60R 21/276* (2006.01)

(52) U.S. Cl.
USPC .......................................... 280/739; 280/731

(58) Field of Classification Search .................. 280/739, 280/731, 730.2
See application file for complete search history.

(56) References Cited

U.S. PATENT DOCUMENTS

| 7,111,866 B2 * | 9/2006 | Abe et al. ....................... 280/729 |
| 7,458,607 B2 * | 12/2008 | Abe ............................. 280/739 |
| 7,497,467 B2 * | 3/2009 | Chida et al. ................... 280/739 |
| 7,607,690 B2 * | 10/2009 | Abe et al. ...................... 280/739 |
| 7,726,685 B2 * | 6/2010 | Abe et al. ...................... 280/736 |
| 8,128,124 B2 * | 3/2012 | Abe .............................. 280/739 |
| 8,186,713 B2 * | 5/2012 | Fischer et al. ................ 280/739 |
| 8,267,425 B2 * | 9/2012 | Chida et al. ................... 280/736 |
| 2007/0013177 A1 * | 1/2007 | Abe .............................. 280/739 |
| 2009/0020991 A1 * | 1/2009 | Abe et al. ...................... 280/739 |
| 2012/0068444 A1 * | 3/2012 | Suzuki et al. ................. 280/739 |
| 2012/0074677 A1 * | 3/2012 | Hiruta et al. .................. 280/739 |

FOREIGN PATENT DOCUMENTS

JP A-2000-016228 1/2000

* cited by examiner

*Primary Examiner* — Drew Brown
(74) *Attorney, Agent, or Firm* — Posz Law Group, PLC

(57) ABSTRACT

An airbag is provided with a vent hole and a patch closing the vent hole. The airbag has a conically-shaped protrusion with the front narrowed when inflation is finished. The vent hole and patch are at the vehicle body side wall of the protrusion. The airbag has the reaction force-receiving contact portion that is partially recessed toward an occupant by receiving a reaction force substantially opposite to the approach direction of the occupant from the reaction force-applying support portion of the vehicle body structure when the occupant is cushioned, at the vehicle body side wall of the protrusion. The patch is positioned where the vent hole can keep closed when the airbag finishes inflating. The patch is not pressed against the reaction force-applying support portion but is spaced from the circumferential edge portion of the vent hole that moves when the reaction force-receiving contact portion is recessed.

9 Claims, 11 Drawing Sheets

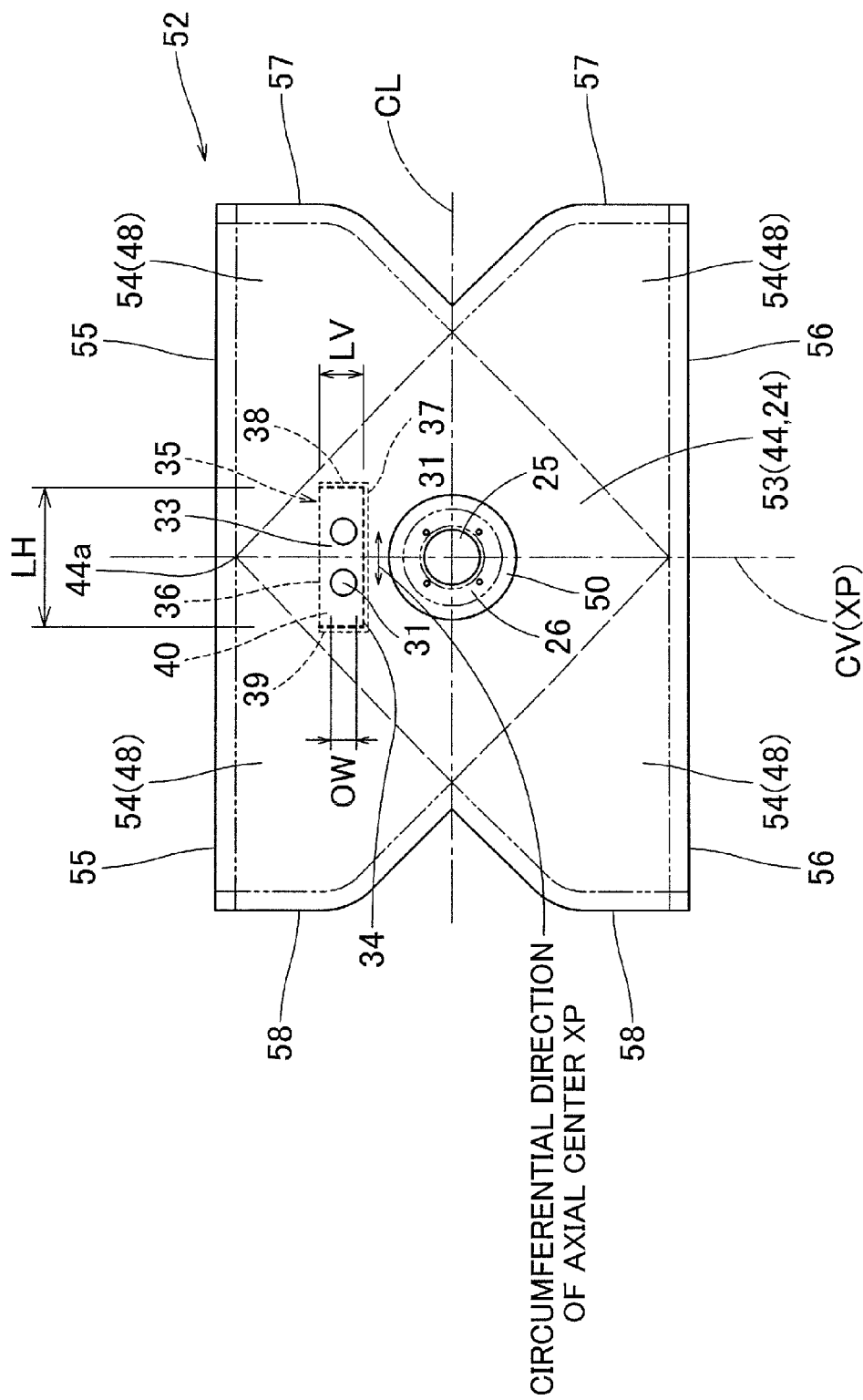

AIRBAG APPARATUS

The present application claims priority from Japanese Patent Application No. 2011-016635 of Naganawa et al., filed on Jan. 28, 2011, the disclosures of which is hereby incorporated into the present application by reference.

BACKGROUND OF THE INVENTION

1. Field of the Invention

The present invention relates to an airbag apparatus that cushions and protects an occupant with an airbag that is inflated by an inflation gas supplied into the airbag, and is suitable for the driver's seat, the passenger seat or the like. The airbag of the airbag apparatus has vent holes allowing the inflation gas therein to be discharged when the internal pressure increases.

2. Description of Related Art

In conventional airbag apparatus, the outer wall of the airbag has a restraining wall that cushions an occupant and a vehicle body side wall that is supported by the vehicle body structure when the occupant is cushioned. The airbag is inflated by an inflation gas supplied into the airbag such that the restraining wall and the vehicle body side wall move away from each other. As described in JP-A-2000-16228, there is an airbag in which vent holes are disposed at a vehicle body side wall and a patch is disposed to cover the outer circumferential side of the vent hole. In the airbag, the remaining inflation gas is discharged from the vent holes to prevent breakage when the internal pressure increases after inflation is finished. The patch has a substantially semicircular outer shape. The patch is disposed such that the straight edge covers the outer circumferential side of the vent hole, toward the center portion of the ring portion of the steering wheel (toward the center portion of the vehicle body side wall). Further, the patch has an arc shape edge connected to the vehicle body side wall of the circumference of the vent hole and a straight edge not connected to the vehicle body side wall. Further, the patch is pressed by the inflation gas to be lifted up from the vehicle body side wall and the inflation gas is discharged from the gap between the straight edge and the vehicle body side wall, when the internal pressure increases.

Further, the patch has a tucked portion that reduces the layer length (area) to ensure airtightness when closing the vent hole. In the airbag, a suture thread sewing the tucked portion is cut when the internal pressure increases. Further, the airbag opens the vent hole by lifting up the patch from the vehicle body side wall (see FIGS. 10 to 13 in JP-A-2000-16228).

However, the airbag in conventional airbag apparatus of three-dimensionally inflates. Accordingly, in the conventional airbag apparatus, a patch having a tucked portion is attached to the circumference of the vent hole in order to ensure airtightness when closing the vent hole. That is, in the airbag apparatus, it is necessary to attach the patch to the circumference of the vent hole of the airbag, for example by sewing. Further, it is necessary to sew in advance the tucked portion to the patch. Therefore, it takes time to dispose the patch in airbag apparatus.

Further, the tucked portion is removed by cutting the suture thread. Therefore, when the suture thread is non-uniformly cut, the exhaust timing from the vent hole of each airbag cannot be stable. That is, it is necessary to make the exhaust timing more stable in the conventional airbag apparatus.

SUMMARY OF THE INVENTION

The present invention has been made in an effort to provide an airbag apparatus that makes it possible to simply dispose a patch, which openably closes a vent hole, while ensuring favorable airtightness, and can make the exhaust timing of an airbag stable.

An airbag apparatus according to the present invention includes an airbag that is inflated by inflow of an inflation gas to cushion an occupant and a vehicle body structure that supports the airbag receiving the occupant. The airbag includes an outer circumferential wall composed of a restraining wall receiving the occupant and a vehicle body side wall supported by the vehicle body structure when the occupant is cushioned. Further, the airbag includes a vent hole and a patch closing the vent hole. The vent hole is disposed at the vehicle body side wall and opened to discharge the inflation gas when the internal pressure increases. Further, the airbag has a protrusion that has a conical shape with the front narrowed when inflation is finished, around the interface of the restraining wall and the vehicle body side wall. Further, the vehicle body structure has a reaction force-applying portion that supports the protrusion and applies a reaction force substantially opposite to the approach direction of the occupant to the protrusion, when the airbag cushions the occupant after the airbag finishes inflating. Meanwhile, the protrusion has a reaction force-receiving contact portion that is in contact with the reaction force-applying support portion and is partially recessed toward the occupant approaching by receiving the reaction force. Further, the vent hole and the patch are disposed at the vehicle body side wall of the protrusion around the reaction force-receiving contact portion. Further, the vent hole is disposed along the axial center of the protrusion at a position where the vent hole is not pressed, in parallel with the reaction force-receiving contact portion, at the reaction force-applying support portion when the airbag cushions the occupant. Further, the patch disconnects the edge of the reaction force-receiving contact portion to be spaced away from the vehicle body side wall. Further, the patch connects at least both edges opposite to the circumferential direction about the axial center of the protrusion that protrudes in a conical shape to the outer circumferential wall of the airbag. Further, the connection state of the patch is a state in which the patch and the circumferential edge of the vent hole are developed and connected to overlap each other in a flat shape. Further, the patch is positioned to keep the vent hole closed before the occupant is cushioned after the airbag finishes inflating. Further, the patch is positioned at a position where the region from the portion covering at least the vent hole to the edge of the reaction force-receiving contact portion is not pressed against the reaction force-applying support portion when the airbag cushions the occupant. Further, the patch is disposed at a position where the region from the portion covering at least the vent hole to the edge of the reaction force-receiving contact portion is spaced from the circumferential edge of the vent hole that moves as the reaction force-receiving contact portion is recessed when the occupant is cushioned.

In the airbag apparatus according to the present invention, when the airbag that finishes inflating cushions an occupant, the reaction force-receiving contact portion is supported by the reaction force-applying support portion of the vehicle body structure. Further, the reaction force-receiving contact portion is recessed by receiving a reaction force in the substantially opposite direction to the approach direction of the occupant and moves toward the occupant relatively to the patch around the reaction force-receiving contact portion. That is, in this process, as the reaction force-receiving contact portion moves toward the occupant who has approached the airbag relatively to the patch, the circumferential edge portion of the vent hole also moves toward the occupant relatively to the patch. As a result, a gap is generated between the vent hole and the patch, the vent hole is opened, and the inflation gas in the airbag is discharged from the vent hole.

In this process, the patch is disposed at a position where the area from the portion covering the vent hole to the edge of the reaction force-receiving contact portion is not pressed against the reaction force-applying support portion. Therefore, the patch becomes stable and the gap can be generated between the vent hole and the patch.

Further, the patch connects both edges opposite to the circumferential direction about the axial center of the protrusion that protrudes in a conical shape of the airbag to the outer circumferential wall of the airbag. Therefore, the patch keeps inflating outward after the airbag finishes inflating, such that it is not partially recessed to close the vent hole even if the circumferential edge of the vent hole moves toward the occupant. As a result, when the airbag cushions the occupant, the patch is stable and a gap can be generated between the vent hole and the patch, even if the circumferential edge of the vent hole moves toward the occupant.

Further, the patch is developed flat together with the circumferential edge of the vent hole to overlap the circumferential edge of the vent hole, at least both edges are sewed, for example, and connected to the outer circumferential wall of the airbag. That is, the patch can be disposed by a connection work, such as planar sewing, without a tucked portion, such that it is possible to simply dispose the patch without trouble.

Obviously, the patch connects both edges opposite to each other in the circumferential direction about the axial center of the protrusion, which protrudes in a conical shape of the airbag, to the outer circumferential wall of the airbag, and appropriately connects the edge spaced apart from the reaction force-receiving contact portion to the outer circumferential wall of the airbag. Therefore, when the airbag finishes inflating, as the protrusion inflates, the patch is pulled in the circumferential direction about the axial center of the protrusion and inflates outward, thereby easily pressing the circumferential edge of the vent hole. As a result, the patch can be stable with airtightness ensured and the vent hole can be closed before the airbag cushions the occupant after finishing inflating.

Further, the protrusion where the patch is disposed inflates in a conical shape with the front narrowed. That is, the base portion that is large in diameter than the front end of the protrusion inflates to be large, such that rigidity is easily ensured. Therefore, even if the reaction force-receiving contact portion receives a reaction force from the reaction force-applying support portion of the vehicle body structure, the protrusion does not make deformation that largely inclines the conical axial center. As a result, the protrusion of the airbag can move the portion of the reaction force-receiving contact portion including the portion of the vent hole toward the occupant partially and relatively to the patch and can be stable and open the vent hole.

Further, the vent hole is not opened by cutting of a sewing thread of a tucked portion in the conventional patch. That is, the vent hole is opened in accordance with the movement amount to the occupant of the circumferential edge of the vent hole relative to the patch when the airbag cushions the occupant. In other words, the vent hole is opened in accordance with the stroke of the occupant approaching the airbag. Therefore, the exhaust timing of the airbag is stable, corresponding to the stroke of the occupant approaching the airbag.

Therefore, in the airbag apparatus according to the present invention, it is possible to simply dispose the patch, which openably closes the vent hole, with favorable airtightness ensured, and it is possible to stabilize the exhaust timing of the airbag.

Further, in the airbag apparatus according to the present invention, it is preferable that the patch be connected to the outer circumferential wall of the airbag, with the length in the circumferential direction about the axial center of the protrusion larger than the length defined along the axial center of the protrusion, as a dimension of the region surrounded by the joint of the airbag to the outer circumferential wall.

In this configuration, the longitudinal direction of the patch is aligned in the circumferential direction about the axial center of the protrusion. Accordingly, the patch grows in the circumferential direction of the protrusion and can come in closer contact with the circumferential edge of the vent hole, when the protrusion inflates. As a result, the patch can further ensure the airtightness when the airbag finishes inflating and the vent hole is closed.

In this case, it is preferable that a plurality of vent holes be disposed to be separated, in the circumferential direction about the axial center of the protrusion.

According to this configuration, the following advantages are achieved as compared with when the number of the vent holes is reduced and the opening dimensions of the vent hole are increased. That is, in this configuration, the length defined along the axial center of the protrusion in the region where the vent hole is disposed can be reduced and the opening width defined along the axial center of the protrusion of the vent hole can be reduced. Therefore, in the patch closing the vent holes, the length in the circumferential direction about the axial center of the protrusion can be easily increased larger than the length defined along the axial center of the protrusion. As a result, in this configuration, it is possible to close the vent holes with favorable airtightness. Further, the airbag can be provided with a plurality of vent holes. Therefore, the airbag can simultaneously open the plurality of vent holes when the patch moves away from the circumferential edges of the vent holes, without reducing the entire opening area of the vent holes. As a result, the airbag discharges the inflation gas well and can smoothly prevent an increase in internal pressure.

Further, the airbag of the airbag apparatus of the present invention may have partially one conical protrusion or a plurality of conical protrusions where the patch and the vent hole are disposed. As an airbag having a plurality of protrusions, a substantially four-sided pyramid shape having a restraining wall at the top and a vehicle body side wall at the bottom portion may be implemented. Further, in the airbag, at least one of four corners of the bottom portion of the substantially four-sided pyramid shape is the protrusion of the airbag of the present invention, where the reaction force-receiving contact portion, the vent hole, and the patch are disposed.

Further, in the airbag having the substantially four-sided pyramid shape, the bottom wall is the vehicle body side wall and the cylindrical top with the front narrowed is the restraining wall. Further, in the airbag, flatness is more easily ensured at the vehicle body side wall than the restraining wall when inflation is finished. Therefore, in the airbag, it is possible to rapidly stabilize the complete inflation posture. In other words, in the airbag, it is possible to rapidly ensure the stop state (suppress rebound) after inflation is finished and it is possible to rapidly cushion the occupant with a stable posture.

Further, the airbag apparatus according to the present invention may be implemented as an airbag apparatus for a driver's seat. In this case, the vehicle body structure supporting the reaction force-receiving contact portion of the airbag is a ring portion that is held with hands when the steering wheel is operated, and the airbag is accommodated in the boss portion at the center of the steering wheel.

When the airbag apparatus according to the present invention is an airbag apparatus for a driver's seat, the reaction force-applying support portion can be a ring-shaped ring portion of a steering wheel and the ring portion can smoothly come in partial contact with the reaction force-receiving contact portion of the protrusion of the airbag. In this case, the patch or the vent hole at the vehicle body side wall can be disposed at the inside position of the ring portion adjacent to the reaction force-receiving contact portion or at the outside position of the ring position adjacent to the reaction force-receiving contact portion.

Further, the airbag apparatus according to the present invention may be implemented as an airbag apparatus for a passenger seat. In this case, the vehicle body structure supporting the reaction force-receiving contact portion of the airbag is a windshield disposed in front of the passenger seat, and the airbag is accommodated in an instrument panel disposed in front of the passenger seat.

Further, the patch can be connected or cannot be connected the edge opposite to the non-connected edge, and separated from a side of the reaction force-receiving contact portion, to the vehicle body side wall.

BRIEF DESCRIPTION OF DRAWINGS

FIG. 5 is a development view showing a bag base cloth of the airbag according to the first embodiment shown in FIG. 1.

FIG. 11 is a schematic perspective view showing when an airbag according to another modified example inflates as a single body, in which

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
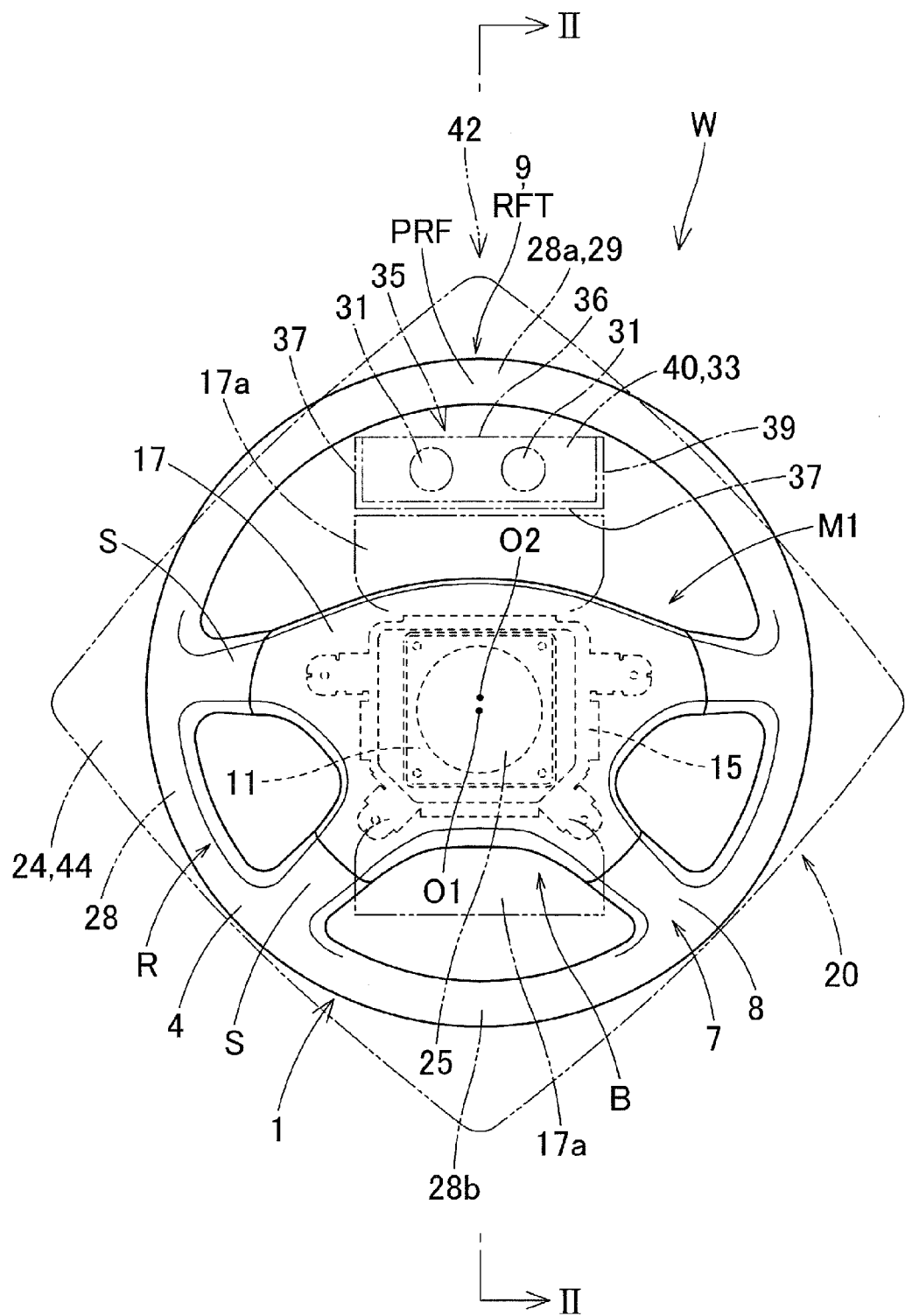
FIG. 1 is a plan view of a steering wheel where an airbag apparatus according to a first embodiment of the present invention is mounted.
Figure 2:
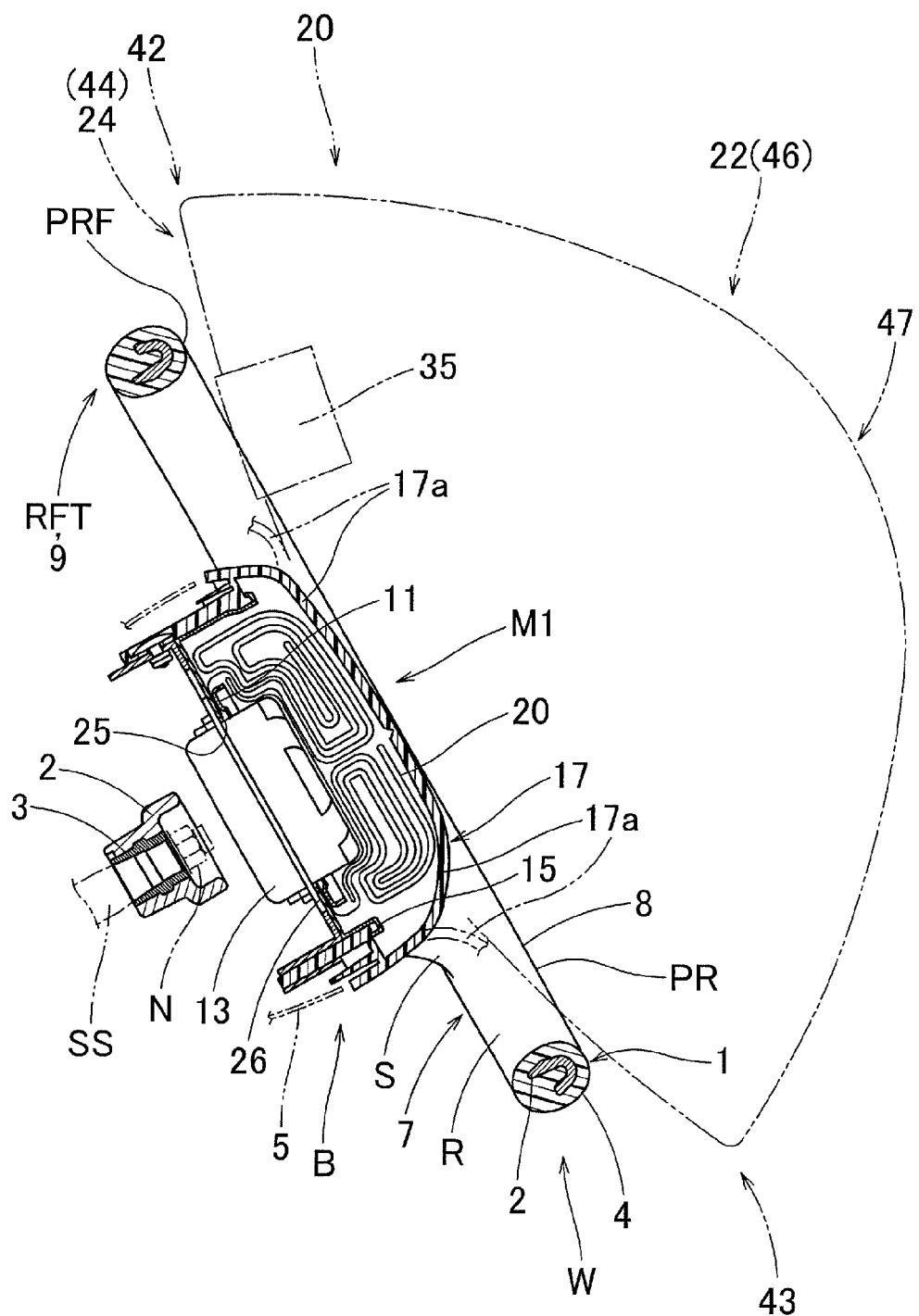
FIG. 2 is a longitudinal cross-sectional view of the airbag apparatus according to the first embodiment shown in FIG. 1, taken along the line II-II in FIG. 1.

An airbag apparatus M1 according to a first embodiment, as shown in FIGS. 1 and 2, is for a driver's seat, mounted in a steering wheel W. The steering wheel W includes a wheel body 1 and the airbag apparatus M1 disposed on a boss portion B at the center of the wheel body 1. The wheel body 1 has a ring portion R that is held by hands for steering, the boss portion B that is fastened to a steering shaft SS at the center of the ring portion R, and four spokes S connecting the boss portion B with the ring portion R.

Further, in the airbag apparatus M1 according to the first embodiment, except the case of notifying specifically the up-down direction corresponds to the up-down direction along the axial direction of the steering shaft SS, the front-rear direction corresponds to the front-rear direction perpendicular to the axial direction of the steering shaft SS when the vehicle is steered to travel straight, and the lateral direction corresponds to the lateral direction perpendicular to the axial direction of the steering shaft SS when the vehicle is steered to travel straight.

The wheel body 1, as shown in FIG. 2, includes a metal core 2 made of an aluminum alloy or the like. The metal core 2 is disposed to connect the ring portion R, the boss portion B, and the spokes S. The portion of ring portion R of the metal core 2 and the ring portion R-sided portions of the spokes S are coated with a coating layer 4 made of synthetic resin. A steel boss 3 is disposed at the portion of the boss portion B of the metal core 2. The steering shaft SS is connected to the boss 3 by inserting the steering shaft SS and firmly tightening a nut N on the steering shaft SS. Further, a lower cover 5 made of synthetic resin and covering the lower portion of the boss portion B is disposed under the wheel body 1.

The airbag apparatus M1, as shown in FIG. 2, includes an airbag 20 folded small and accommodated therein, an inflator 13 supplying an inflation gas into the airbag 20, an airbag cover 17 covering the upper portion of the small-folded airbag 20, a case 15 accommodating and retaining the inflator 13 and the airbag 20 and retaining the airbag cover 17, and a retainer 11 fixing the airbag 20 with the inflator 13 in the case 15.

The retainer 11 is formed in a substantially rectangular ring shape. The retainer 11 is mounted to the case 15 while pressing a mounting seat 26 at the circumference of an inflow opening 25 of the airbag 20. Further, the airbag cover 17 is made of synthetic resin. The airbag cover 17 cover the side of the accommodated airbag 20 from above. Further, the airbag cover 17 has two doors 17a. The two doors 17a are opened to both sides of front and back by being pushed by the inflating airbag 20.

Figure 3:
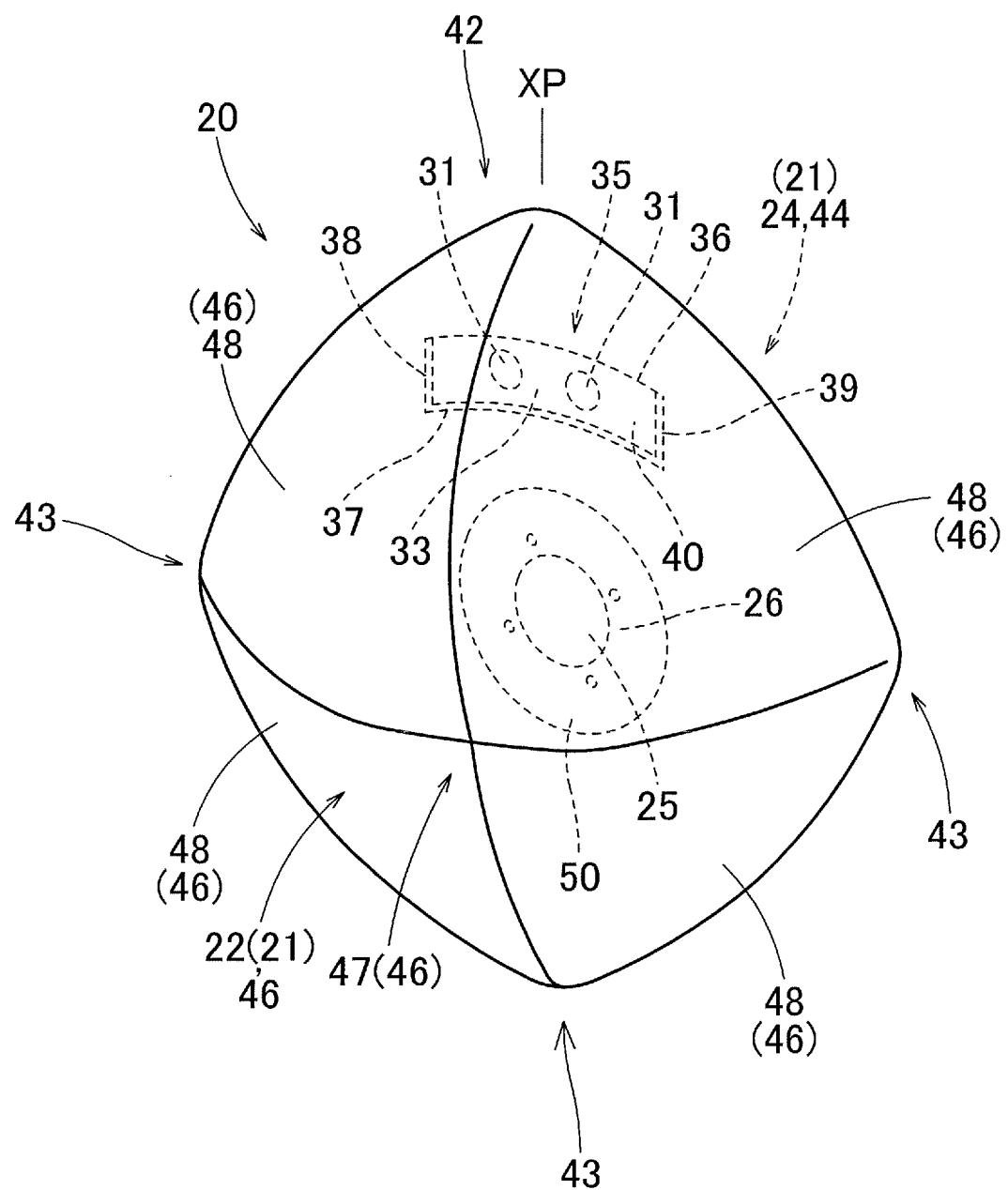
FIG. 3 is a schematic perspective view showing when the airbag of the airbag apparatus according to the first embodiment shown in FIG. 1 inflates as a single body, seen from a side of a restraining wall.
Figure 4:
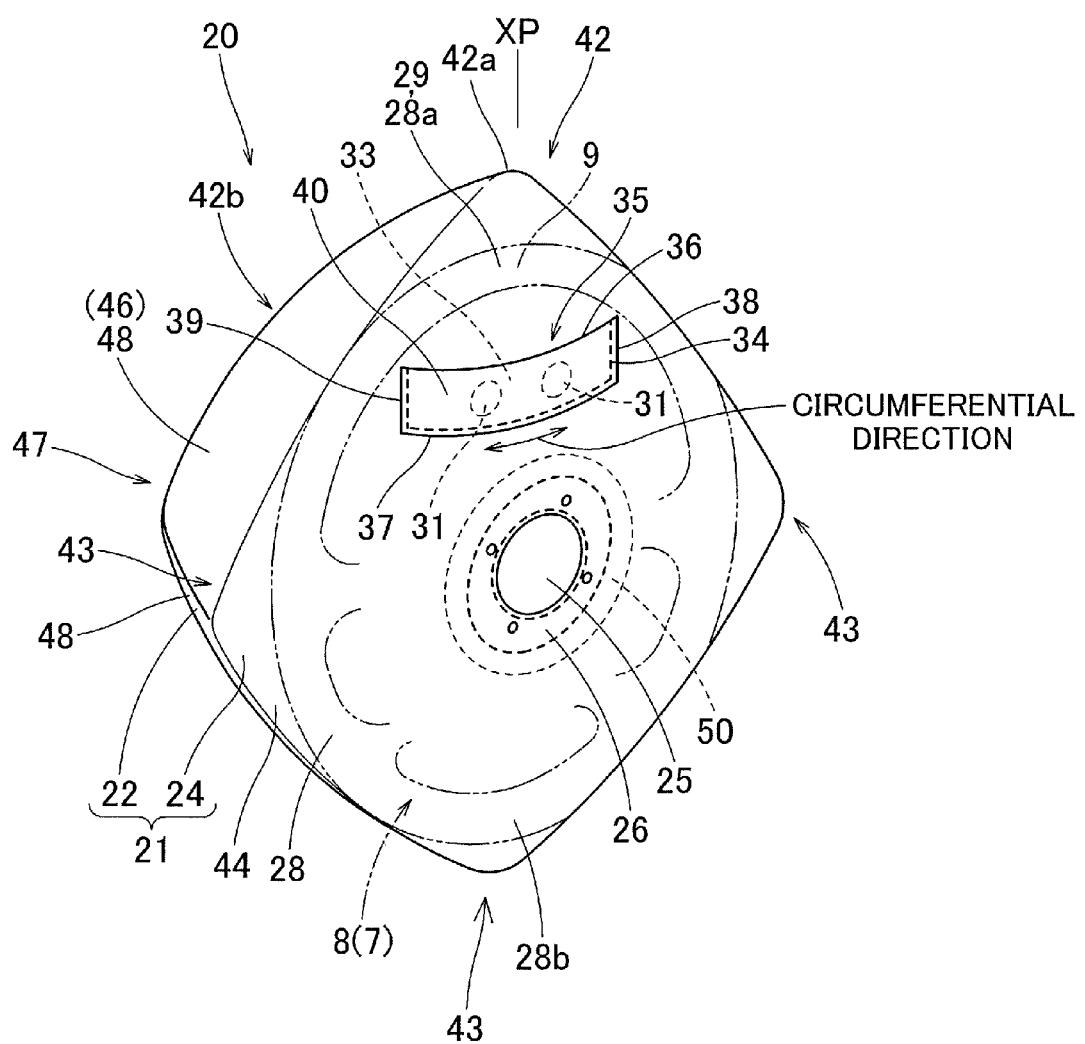
FIG. 4 is a schematic perspective view showing when the airbag of the airbag apparatus according to the first embodiment shown in FIG. 1 inflates as a single body, seen from a side of a vehicle body side wall.

The airbag 20, as shown in FIGS. 3 and 4, has a substantially four-sided pyramid shape when completely inflated as a single body. The airbag 20 has an outer circumferential wall 21 and reinforcing cloth 50 disposed on the inner circumferential surface. Further, the outer circumferential wall 21 has a bottom wall 44 having a rectangular shape (in detail, substantially square shape) and a circumferential wall 46 extending to narrow upward from the outer circumferential edge of the bottom wall 44 to a top 47 above. The circumferential wall 46 has four side walls 48 formed in substantially triangular plate shapes from the top 47 to the bottom wall 44. The inflow opening 25 that is a circular hole where the inflator 13 is inserted is formed at the center portion of the bottom wall 44. The inflator 13 supplies an inflation gas G into the airbag 20. The circumferential edge of the inflow opening 25, as described above, is the mounting seat 26 mounted on the case 15.

Further, in the airbag 20, the circumferential wall 46 is a restraining wall 22 that cushions an occupant (driver) D and the bottom wall 44 is a vehicle body side wall 24 that is supported by a vehicle body structure 7 when cushioning the driver D. Further, the airbag 20 inflates when the inflation gas G flows therein while the restraining wall 22 and the vehicle body side wall 24 move away from each other (see FIGS. 6A and 6B). Further, in the first embodiment, the airbag apparatus M1 is mounted in the steering wheel W. Therefore, the vehicle body structure 7 becomes the wheel body 1 and the supporting portion 8 of the vehicle body structure 7 supporting the airbag 20 becomes the portions of the upper surfaces of the boss portion B, the spokes S, and the ring portion R of the wheel body 1 with the doors 17a open. Further, an upper surface PRF of a front end portion RFT of the ring portion R becomes a reacting force-applying support portion 9, as described below.

Further, the airbag 20 has a spherical shape to be able to softly cushion the driver D, around the top 47 of the center of the restraining wall 22.

Further, a bag base cloth 52 constituting the airbag 20, as shown in FIG. 5, is a fabric made of synthetic fiber, such as polyamide or polyester. A gas leakage prevention coating layer is appropriately formed on the bag base cloth 52, at the side that is the inner circumferential surface of the airbag 20. The bag base cloth 52 is composed of a bottom wall part 53 and a side wall part 54. The bottom wall part 53 has a substantially square shape forming the bottom wall 44. The side wall part 54 forms each side wall part 48 of the circumferential wall 46, radially extending from the bottom wall part 53. The airbag 20 is fabricated as follows. That is, a folding line is made along a center line CV in the front-rear direction at the center in the lateral direction and the bag base cloth 52 is folded in half. Next, overlapping left and right edges 55 and 55 of the front edge and overlapping left and right edges 56 and 56 of the rear edge are sewed respectively. Thereafter, the folded and overlapping portion is unfolded and folded in half by a folded line made along a center line CL in the lateral direction at the center in the front-rear direction. Further, overlapping front and rear edges 57 and 57 of the left edge and overlapping front and rear edges 58 and 58 of the right edge are sewed respectively. Thereafter, the airbag 20 is fabricated by turning the cloth inside out by using the inflow opening 25 such that the stitches are not exposed on the outer surface.

Further, the bag base cloth 52 is provided with the inflow opening 25, a vent hole 31, a patch 35, and a reinforcing cloth 50 before sewing in advance. Further, when the folding line is made and the cloth is folded before sewing, the surfaces that are the outer surfaces of the airbag 20 are folded to overlap and contact with each other. Further, the patch 35 or the reinforcing cloth 50 is made of a fabric made of synthetic fiber, such as flexible polyamide or polyester, similar to the bag base cloth 52.

The airbag 20 has a substantially four-sided pyramid shape when completely inflated. Therefore, conical protrusions 42, 43, 43, and 43 are disposed at four corners of the vehicle body side wall 24, at the interface of the bottom wall 44 corresponding to the vehicle body side wall 24 and the circumferential wall 46 corresponding to the restraining wall 22. Further, the vent hole 31 and the patch 35 are disposed at the portion of the protrusion 42 protruding forward, which is at a side of the vehicle body side wall 24.

In the first embodiment, the vehicle body side wall 24 has a contact portion 28 having a ring shape being in contact with an upper surface PR of the ring portion R. Further, the area where the vent hole 31 is disposed is positioned behind the contact portion 28, at a rear side that is a center O1 (inflow opening 25) of the vehicle body side wall 24 (see FIGS. 1 and 4). In particular, the portion being in contact with the upper surface PRF (the reaction force-applying support portion 9 in the embodiment) of the front end portion RFT of the ring portion R, in the contact portion 28, is a reaction force-receiving contact portion 29. Further, when the airbag 20 has finished inflating and the driver (occupant) D is cushioned, the reaction force-receiving contact portion 29 receives a reaction force in a direction (upward in the embodiment and rearward and upward about the vehicle) substantially opposite to the entry direction of the driver D (downward in the embodiment and front downward in the straight-traveling direction of the vehicle about the vehicle), and is partially recessed toward the driver D.

Further, when the airbag 20 has finished inflating, the vehicle body side wall 24 covers substantially the entire upper side of the upper surface PR of the ring portion R while four corners protrude from the ring portion R.

Figure 6A:
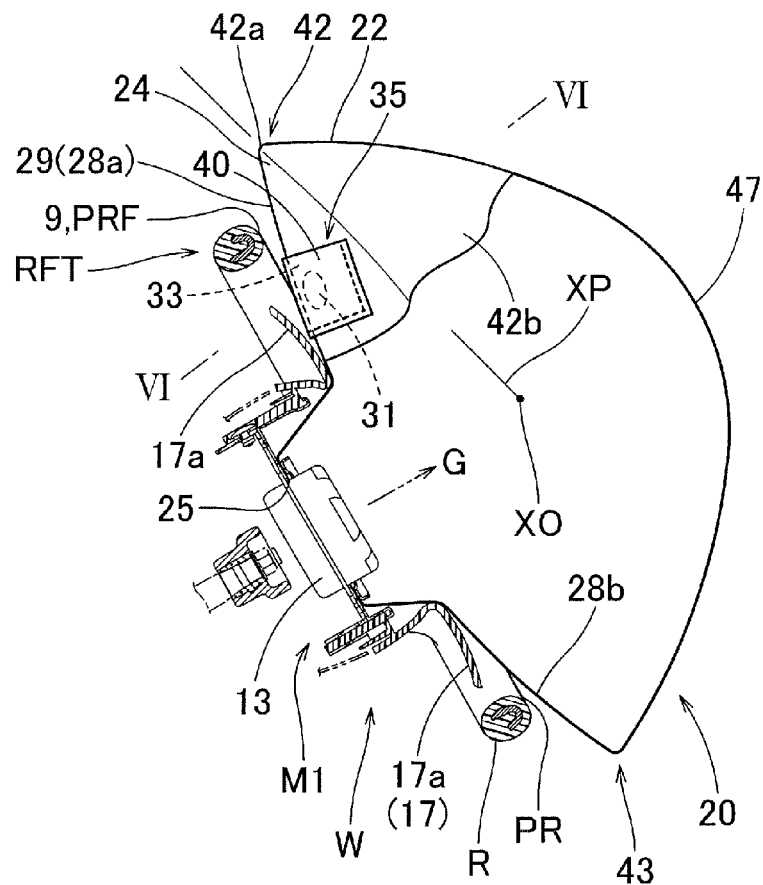
FIG. 6A is a view illustrating when the airbag apparatus according to the first embodiment shown in FIG. 1 operates before an occupant is cushioned after the airbag finishes inflating and FIG. 6B is a cross-sectional view taken along the line VI-VI.

In the first embodiment, before the driver D is cushioned after the airbag 20 finishes inflating, as shown in FIGS. 2 and 6A, the reaction force-receiving contact portion 29 is mostly not in contact with the reaction force-applying support portion 9. Further, as shown in FIG. 7, when the restraining wall 22 of the airbag 20 cushions the driver D approaching downward, the reaction force-receiving contact portion 29 is in strong contact with the support portion 9 and recessed relatively to approach the driver D. That is, when the restraining wall 22 of the airbag 20 cushions the driver D approaching downward, the periphery of the reaction force-receiving contact portion 29 is pushed downward by downward pressing of the driver D. However, the reaction force-receiving contact portion 29 is limited in downward movement by the reaction force-applying support portion 9. Therefore, in the region of the vehicle body side wall 24 of the protrusion 42, the reaction force-receiving contact portion 29 relatively moves toward the driver D approaching, that is, in the substantially opposite direction (upward) to the direction in which the driver D approaches the airbag 20.

Figure 7A:
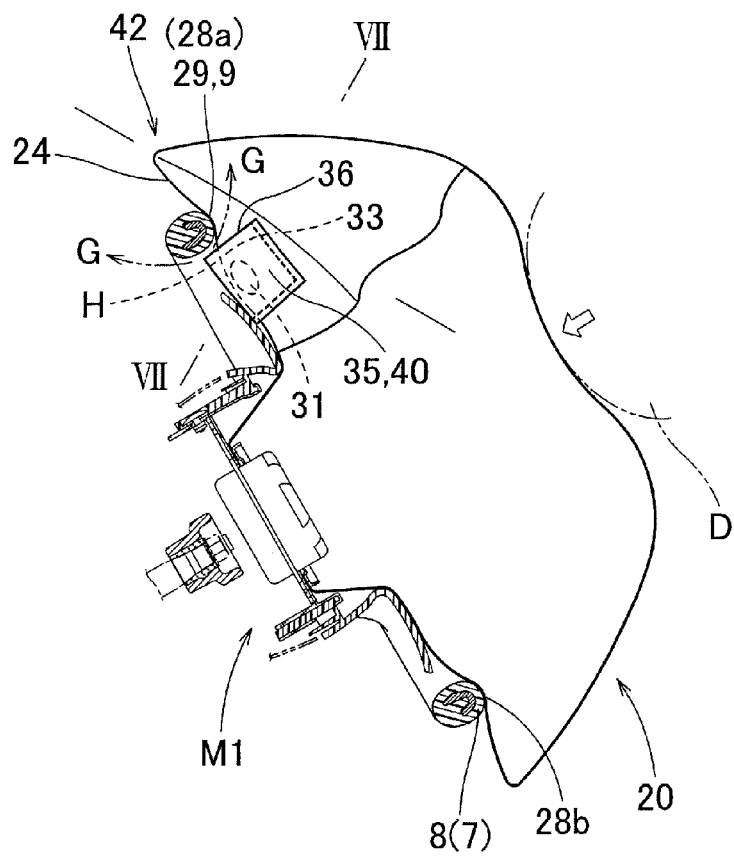
FIG. 7A is a view illustrating when the airbag apparatus according to the first embodiment shown in FIG. 1 operates and an occupant is cushioned after the airbag finishes inflating and FIG. 7B is a cross-sectional view taken along the line VII-VII.
Figure 7B:
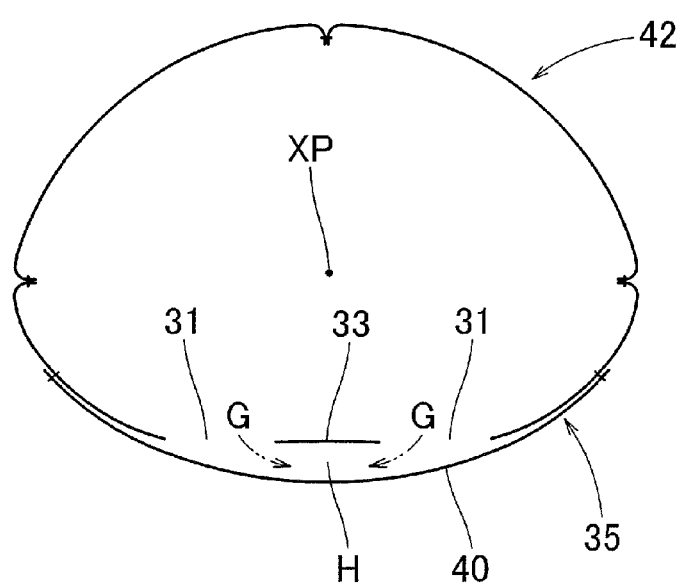

Further, in the first embodiment, as shown in FIG. 1, in the steering wheel W, the center of the boss portion B where the airbag apparatus M1 is mounted (that is, the center O1 of the inflow opening 25) is disposed behind the center of the wheel body 1 (that is, a center O2 of the ring portion R) when seen from above. The reason is for allowing the steering wheel W to ensure favorable visibility of meters at the front portion, inside the front end portion RFT of the ring portion R. Therefore, the reaction force-receiving contact portion 29 is positioned above a portion 28b being in contact with the ring portion R of the rear end of the contact portion 28. That is, before the driver D is cushioned after the airbag 20 finishes inflating, the contact portion 29 is no closer to the upper surface PR of the ring portion R including the reaction force-applying support portion 9 than the portion 28b. Further, when the restraining wall 22 of the airbag 20 cushions the driver D approaching downward, as shown in FIGS. 7A and 7B, the reaction force-receiving contact portion 29 smoothly comes in contact with the reaction force-applying support portion 9 and is recessed to approach the driver D.

Further, in the first embodiment, the vent hole 31 and the patch 35 are disposed at the vehicle body side wall 24 around the reaction force-receiving contact portion 29.

Figure 6B:
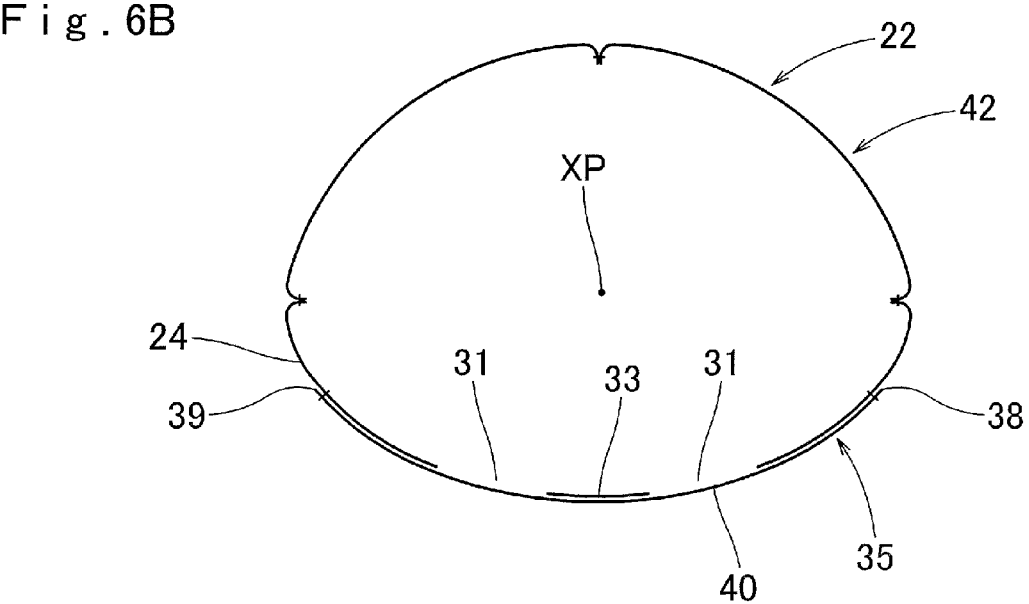

The vent hole 31 is arranged in parallel with the reaction force-receiving contact portion 29 along an axial center XP of the protrusion 42, at a position where the vent hole 31 is not pressed at the reaction force-applying support portion 9 when the airbag 20 cushions the occupant. In the first embodiment, the axial center XP of the protrusion 42 is disposed in the front-rear direction (in detail, as shown in FIGS. 6A and 6B, the front-rear direction around the center XO between the top 47 and the inflow opening 25 to a front end 42a of the protrusion 42) and the vent hole 31 is disposed at the rear portion of the reaction force-receiving contact portion 29.

In other words, in the first embodiment, the reaction force-applying support portion 9 is disposed between the front end 42a of the protrusion 42 and the position where the vent hole 31 or the patch 35 is disposed. That is, the front end 42a, the reaction force-applying support portion 9 (reaction force-receiving contact portion 29), and the vent hole 31 or the patch 35 are sequentially disposed in the direction from the front end 42a of the protrusion 42 to a base portion 42b.

Further, in the embodiment, the vent hole 31 is a circular opening and two vent holes are formed along the circumference about the axial center XP of the protrusion 42 to be separated. In other words, the vent holes 31 and 31 are disposed linearly symmetrically to the left and right with the front-rear directional center line CV therebetween (see FIG. 5). The center line CV is a front-rear directional center line connecting a corner 44a at the front end of the bottom wall 44 with the center O1 of the inflow opening 25.

Further, the patch 35 is disposed to cover the vent holes 31 and 31 from the outer surface, as shown in FIGS. 3 to 5. In detail, the patch 35 allows a side edge (front edge) 36 of the reaction force-receiving contact portion 29 to be spaced from and not connected with the vehicle body side wall 24. Further, the patch 35 connects at least both edges (left edge 38 and right edge 39) opposite to each other in the circumferential direction about the axial center XP of the protrusion 42 protruding in a conical shape to the vehicle body side wall 24. Further, in this configuration, the patch 35 and a circumferential edge portion 33 of the vent holes 31 and 31 are developed flat and overlap each other to be connected.

Further, in the first embodiment, the patch 35 also connects an edge (rear edge) 37 spaced from the reaction force-receiving contact portion 29 to the vehicle body side wall 24. Further, a joint 34 of the rear edge 37 or the left and right edges 38 and 39 is connected to the vehicle body side wall 24 by sewing.

Further, the patch 35 has the region surrounded by the joint to the vehicle body side wall 24 as a cover portion 40. Further, the patch 35 is positioned such that the cover portion 40 can keep the vent holes 31 and 31 closed before the driver D is cushioned after the airbag 20 finishes inflating. Further, the cover portion 40 in the first embodiment may be the region from the portion covering the vent holes 31 and 31 to the front edge 36 of the reaction force-receiving contact portion 29, as the front end 36 is not connected to the vehicle body side wall 24.

Further, the cover portion 40 is positioned not to be pressed against the reaction force-applying support portion 9, when the airbag 20 cushions the driver D.

Further, the cover portion 40 is positioned to be able to be spaced from the circumferential edge portion 33 of the vent hole 31. The circumferential edge portion 33 is a portion that simultaneously moves when the reaction force-receiving contact portion 29 is recessed when the driver D is cushioned.

In detail, the cover portion 40, as indicated by a two-dot chain line in FIG. 1, is disposed behind the front end portion RFT of the ring portion R when seen from above, and the front edge 36 or the left and right edges 38 and 39 are disposed behind the inner circumferential surface of the ring portion R. Further, the vent holes 31 and 31 are covered by the cover portion 40. With this positional relationship, the patch 35 or the vent holes 31 and 31 are disposed at the vehicle body side wall 24 of the protrusion 42.

Further, in the dimensions of the cover portion 40 of the patch 35, a length LH in the circumferential direction about the axial center XP of the protrusion 42 is larger than a length LV defined along the axial center XP of the protrusion 42 (see FIG. 5). That is, the cover portion 40 of the patch 35 is disposed such that the longitudinal direction is arranged in the circumferential direction about the axial center XP of the protrusion 42.

Further, as for the reaction force-applying support portion 9, the front end portion RFT of the ring portion R constitutes the reaction force-applying support portion 9 in the embodiment. The front end portion RFT is in contact with the reaction force-receiving contact portion 29 of the vehicle body side wall 24 in the direction substantially perpendicular to the axial center XP of the protrusion 42 (in the lateral direction substantially perpendicular to the axial center XP of the front-rear direction when seen from the vehicle body side wall 24). As a result, in the embodiment, the reaction force-applying support portion 9 is implemented by the front end portion RFT that is a portion of the ring-shaped ring portion R and can be in contact only with the partial region with the disposed area removed where the vent hole 31 or the patch 35 is disposed, that is, as much as the reaction force-receiving contact portion 29 that is a portion of the vehicle body side wall 24, in the vehicle body side wall 24.

When the airbag apparatus M1 for a driver's seat according to the first embodiment operates, as shown in FIGS. 2, 6A, and 6B, the inflation gas G is discharged from the inflator 13. Further, the airbag 20 into which the inflation gas G is supplied inflates. For this configuration, the doors 17a and 17a of the airbag cover 17 are pushed to be opened forward and rearward and the airbag 20 protrudes from the case 15 that is an accommodating portion, and covers the upper surface PR of the ring portion R, thereby finishing inflating.

Thereafter, as shown in FIGS. 7A and 7B, when the airbag 20 that finishes inflating cushions the driver D moving down, the reaction force-receiving contact portion 29 is supported by the reaction force-applying support portion 9 of the vehicle body structure 7. Further, the reaction force-receiving contact portion 29 is recessed by receiving an upward reaction force in a substantially opposite direction to the approach direction of the driver D from the reaction force-applying support portion 9. Further, the reaction force-receiving contact portion 29 moves toward the driver D relatively to the patch 35 around the reaction force-receiving contact portion. That is, in this process, as the reaction force-receiving contact portion 29 moves toward the driver D who approaches the airbag 20 relatively to the patch 35, the circumferential edge portions 33 of the vent holes 31 and 31 also move toward the driver D relatively to the patch 35. As a result, a gap H is generated between the vent holes 31 and 31 and the patch 35, the vent holes 31 and 31 are opened, and the inflation gas G in the airbag 20 is discharged from the vent holes 31 and 31.

In this process, the patch 35 is positioned where the cover portion 40 is not pressed against the reaction force-applying support portion 9 of the vehicle body structure 7. Therefore, the patch 35 becomes stable and the gap H can be generated between the vent holes 31 and 31.

Further, the patch 35 connects both edges 38 and 39 opposite to each other in the circumferential direction about the axial center XP of the protrusion 42 protruding in a conical shape of the airbag 20 to the vehicle body side wall 24 of the airbag 20. Therefore, the patch 35 keeps inflating outward, as shown in FIGS. 6A and 6B, after the airbag 20 finishes inflating. As a result, the patch 35 may not be partially recessed to close the vent holes 31 and 31 even though the circumferential edge portion 33 moves toward the driver D. Therefore, as shown in FIGS. 7A and 7B, even if the circumferential edge portion 33 moves toward the driver D when the airbag 20 cushions the driver D, the patch 35 is stable and the gap H can be generated between the vent holes 31 and 31.

Further, the patch 35 is connected to the vehicle body side wall 24 by being developed flat with the circumferential edge portion 33 to overlap the circumferential edge portion 33 and sewing the left and right edges 38 and 39 with the rear edge 37. That is, the patch 35 can be disposed by a planar connection work that overlapping flat and sewing the patch without a tucked portion, such that it is possible to simply dispose the patch, using an industrial sewing machine or the like without trouble.

Further, obviously, the patch 35 is implemented by connecting the left and right edges 38 and 39 opposite to each other in the circumferential direction about the axial center XP of the protrusion 42 to the vehicle body side wall 24 of the airbag 20 and then appropriately connecting the rear end 37 spaced from the reaction force-receiving contact portion 29 to the vehicle body side wall 24. Therefore, when the airbag 20 finishes inflating, as the protrusion 42 inflates, the patch 35 is pulled in the circumferential direction about the axial center XP of the protrusion 42 and inflates outward, thereby easily pressing the circumferential edge portion 33. As a result, before the driver D is cushioned after the airbag 20 finishes inflating, as shown in FIGS. 6A and 6B, the patch 35 is stable and airtightness is ensured, such that the vent holes 31 and 31 can be closed.

Further, as the protrusion 42 inflates in a conical shape with the front narrowed, the base portion 42b that is larger in diameter than the front end 42a of the protrusion 42 inflates to be large, such that rigidity is easily ensured. Therefore, even if the reaction force-receiving contact portion 29 receives a reaction force from the reaction force-applying support portion 9 of the vehicle body structure 7, the protrusion 42 does not make deformation that largely inclines the axial center XP. As a result, the protrusion 42 of the airbag 20 can move a portion 28a of the reaction force-receiving contact portion 29 including the vent holes 31 and 31 partially and relatively with respect to the patch 35 to the driver D, be stable, and open the vent holes 31 and 31.

Further, the openings of the vent holes 31 and 31 are opened not by cutting of the sewing thread at the tucked portion in the conventional patch, but in accordance with the relative movement amount of the circumferential edge portion 33 toward the driver D with respect to the patch 35, when the airbag 20 cushions the driver D. In other words, in accordance with the stroke of the driver D approaching the airbag 20, the vent holes 31 and 31 are opened, such that the exhaust timing of the airbag 20 becomes stable, corresponding to the stroke of the driver D approaching the airbag 20.

Therefore, in the airbag apparatus M1 of the first embodiment, it is possible to simply dispose the patch 35, which openably closes the vent holes 31 and 31, with favorable airtightness ensured, and it is possible to stabilize the exhaust timing of the airbag 20.

Further, in the airbag apparatus M1 of the first embodiment, in the dimensions of the cover portion 40 of the patch 35, the length LH in the circumferential direction about the axial center XP of the protrusion 42 is larger than the length LV defined along the axial center XP of the protrusion 42 and the patch 35 is connected to the vehicle body side wall 24.

In this configuration, the longitudinal direction of the patch 35 is aligned in the circumferential direction about the axial center XP of the protrusion 42. Accordingly, the patch 35 grows in the circumferential direction of the protrusion 42 and can come in closer contact with the circumferential edge portions 33 of the vent holes 31 and 31, when the protrusion 42 inflates. As a result, the patch 35 can further stably ensure the airtightness when the airbag 20 finishes inflating and the vent holes 31 and 31 are closed.

Further, in the first embodiment, a plurality of vent holes 31 (two in the embodiment) are disposed to be separated in the circumferential direction about the axial center XP of the protrusion 42.

According to this configuration, the following advantages are achieved as compared with when the number of the vent holes 31 is reduced and the opening dimensions of the vent holes 31 are increased. That is, in this configuration, the length defined along the axial center XP of the protrusion 42 in the region where the vent hole 31 is disposed, in other words, the length LV of the cover portion 40 closing the vent hole 31 can be reduced. Further, in this configuration, it is possible to reduce the opening width OW along the axial center XP of the protrusion 42 of each of the vent holes 31 (see FIG. 5). Therefore, in the patch 35 closing the vent holes 31 and 31, the length LH in the circumferential direction about the axial center XP of the protrusion 42 can be easily increased larger than the length LV defined along the axial center XP of the protrusion 42. As a result, in this configuration, it is possible to close the vent holes 31 and 31 with favorable airtightness. Further, the airbag 20 has a plurality of vent holes 31 (two in the embodiment) without decreasing the entire opening area of the vent holes 31 and 31. Further, the plurality of vent holes 31 and 31 may be disposed with substantially the same front-rear directional distances along the axial center XP from the reaction force-receiving contact portion 29. Further, the patch 35 is disposed with the edge 36 at the reaction force-receiving contact portion 29 disposed in the circumferential direction of the axial center XP, in other words, the direction substantially perpendicular to the axial center XP. Therefore, when the cover portion 40 of the patch 35 moves away from the circumferential edge portion 33, the plurality of vent holes 31 and 31 simultaneously open. As a result, in the embodiment, the inflation gas G is discharged well and it is possible to smoothly prevent an increase in internal pressure.

Further, the airbag of the airbag apparatus of the present invention may have partially one conical protrusion or a plurality of conical protrusions where the patch or the vent hole are disposed. The airbag 20 of the first embodiment may have a substantially four-sided pyramid shape with the restraining wall 22 disposed at the top 47 and the vehicle body side wall 24 disposed at the bottom wall 44, when finishing inflating. Therefore, in the airbag 20, the conical protrusions 42, 43, 43, and 43 are disposed at four corners of the bottom wall 44 having a substantially four-sided pyramid shape. Further, the reaction force-receiving contact portion 29, the vent hole 31, and the patch 35 are disposed at one front protrusion 42 therein.

In the airbag 20 having a substantially four-sided pyramid shape of the first embodiment, since the bottom wall 44 is the vehicle body side wall 24 and the cylindrical top 47 with the front narrowed is the restraining wall 22, the vehicle body side wall 24 more easily ensure flatness than the restraining wall 22 when inflation is finished. Further, from right before inflation is finished to right after inflation is finished, the airbag 20 shows a rebound behavior in which the contact portion 28 at the bottom wall 44 greatly moves away upward from the support portion 8 implemented by the ring portion R and then approaches and strongly hits against the support portion 8 due to the reaction, and separates due to the contact reaction. However, in the airbag 20, the vehicle body side wall 24 at the flat bottom portion 44 keeps flat. Further, the restraining wall 22 at the circumferential wall 46 inflating in a saucer shape shows a behavior of pressing down the outer circumferential edge of the vehicle body side wall 24 (particularly, the ridges of the adjacent side walls 48 show a behavior of pressing down the four corners of the bottom wall 44 within a range that does not interfere with the conical inflation of the protrusion 42), and the vehicle body side wall 24 can keep flat. As a result, it is possible to rapidly prevent rebound in the airbag 20.

Therefore, in the airbag 20 of the first embodiment, it is possible to rapidly stabilize the complete inflation position when inflation is finished, in other words, it is possible to rapidly ensure the stop state after inflation is finished (prevent rebound) and rapidly cushion the driver D with a stable position.

Further, in the airbag apparatus M1 of the first embodiment, the vehicle body structure 7 supporting the reaction force-receiving contact portion 29 of the airbag 20 is the ring portion R that is held with hands when the steering wheel W is operated, and the airbag 20 is accommodated in the boss portion B at the center of the steering wheel W for the driver's seat.

As described above, when the airbag apparatus M1 is used for the driver's seat, the reaction force-applying support portion 9 of the vehicle body structure 7 partially supporting the protrusion 42 of the airbag 20 may be a portion (the front end portion RFT) of the ring-shaped ring portion R of the steering wheel W. Therefore, the reaction force-applying support portion 9 of the ring portion R is disposed substantially perpendicular to the axial center XP of the protrusion 42 and can come in partial contact with the reaction force-receiving contact portion 29 of the protrusion 42 of the airbag 20 without pressing the cover portion 40 of the patch 35 or the vent holes 31 and 31. On the contrary, the patch 35 or the vent holes 31 and 31 may be easily disposed at the inside position (the side of the center 02) of the ring portion R adjacent to the reaction force-receiving contact portion 29, at the protrusion 42.

Figure 8:
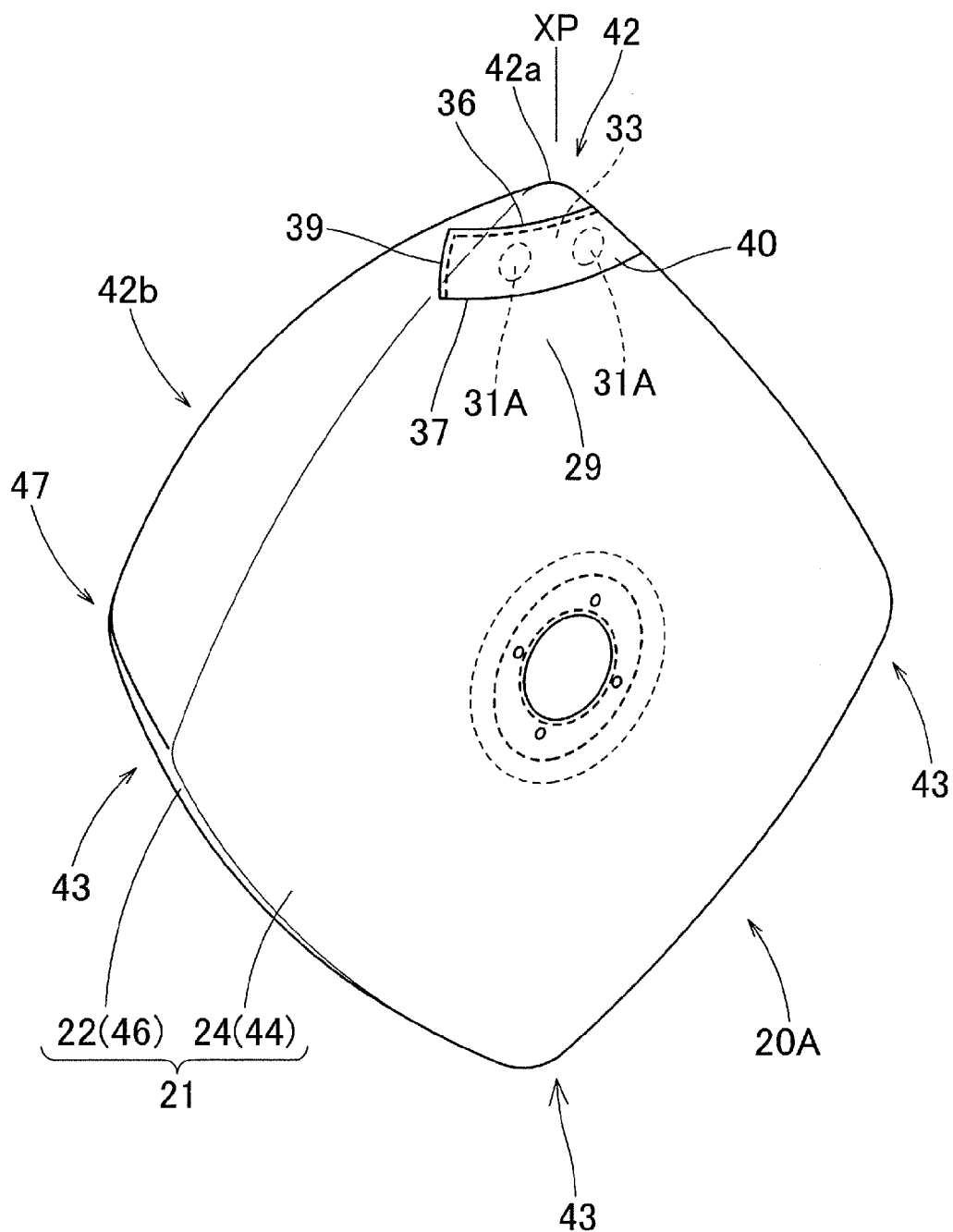
FIG. 8 is a schematic perspective view showing when an airbag of an airbag apparatus according to a second embodiment inflates as a single body, seen from a side of a vehicle body side wall.

Further, in the first embodiment, when the patch 35 or the vent holes 31 and 31 are disposed at the inside position (the center side position) of the ring portion R that is the rear portion further than the reaction force-receiving contact portion 29 is shown. However, an airbag 20A of an airbag apparatus M2 having a configuration according to a second embodiment shown in FIGS. 8, 9A, and 9B may be implemented.

In the airbag 20A, the patch 35 or vent holes 31A and 31A are disposed at the outside position of the ring portion R that is the front side of the ring portion R further than the reaction force-receiving contact portion 29.

The airbag 20A has a similar shape to the airbag 20 of the first embodiment and has a capacity larger than the airbag 20. Therefore, in the airbag 20A, as in the first embodiment, a protrusion 42 having a conical shape with the front narrowed when inflation is finished is disposed at the front side around the interface between the restraining wall 22 and the vehicle body side wall 24. Further, the protrusion 42 has the reaction force-receiving contact portion 29 that is partially recessed toward the driver D by receiving a reaction force substantially opposite to the approach direction of the driver D from the reaction force-applying support portion 9 of the vehicle body structure 7, that is, from the upper surface PRF of the front end portion RFT of the ring portion R, when the driver D is cushioned after the airbag 20A has finished inflating.

Further, the vent holes 31A and 31A and a patch 35A are disposed at the vehicle body side wall 24 at the front side around the reaction force-receiving contact portion 29. Obviously, the vent holes 31A and 31A are also disposed at a position where they are not pressed against the reaction force-applying support portion 9 when the airbag 20A cushions the driver D, as in the first embodiment. Further, the vent holes 31A and 31A are disposed ahead of the reaction force-receiving contact portion 29, in parallel with the reaction force-receiving contact portion 29 along the axial center XP of the protrusion 42, as in the first embodiment.

In other words, in the second embodiment, the vent hole 31A or the patch 35A is disposed between the front end 42a of the protrusion 42 and the reaction force-applying support portion 9. That is, in the second embodiment, the front end 42a, the vent hole 31A or the patch 35A, and the reaction force-applying support portion 9 (reaction force-receiving contact portion 29) are sequentially disposed in the direction from the front end 42a of the protrusion 42 to the base portion 42b.

Further, the patch 35A disconnects the edge of the reaction force-receiving contact portion 29, that is, the rear edge 37 from the vehicle body side wall 24 to be able to be spaced, and connects the left and right edges 38 and 39 opposite to each other in the circumferential direction about the axial center XP of the protrusion 42 protruding in a conical shape to the restraining wall 22 from the vehicle body side wall 24 by sewing, as in the first embodiment. Obviously, in this connection state, the patch 35A and the circumferential edge portions 33 of the vent holes 31A and 31A are developed flat and overlap each other to be connected. Further, the patch 35A connects the front edge 36 to the restraining wall 22 from the vehicle body side wall 24 in the outer circumferential wall 21 of the airbag 20A by sewing.

Figure 9A:
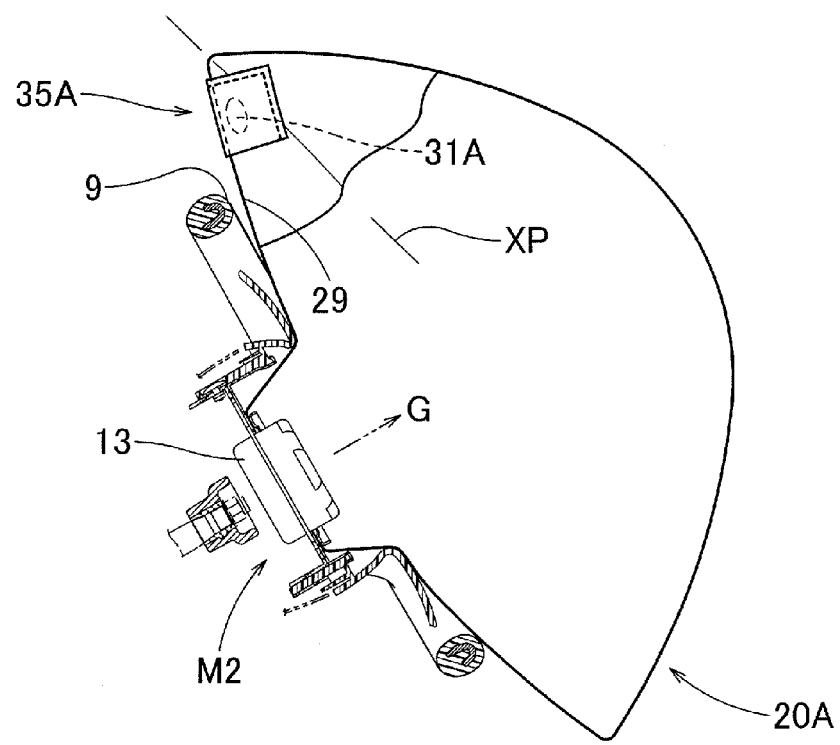
FIGS. 9A and 9B are views sequentially illustrating when the airbag apparatus according to the second embodiment operates.
Figure 9B:
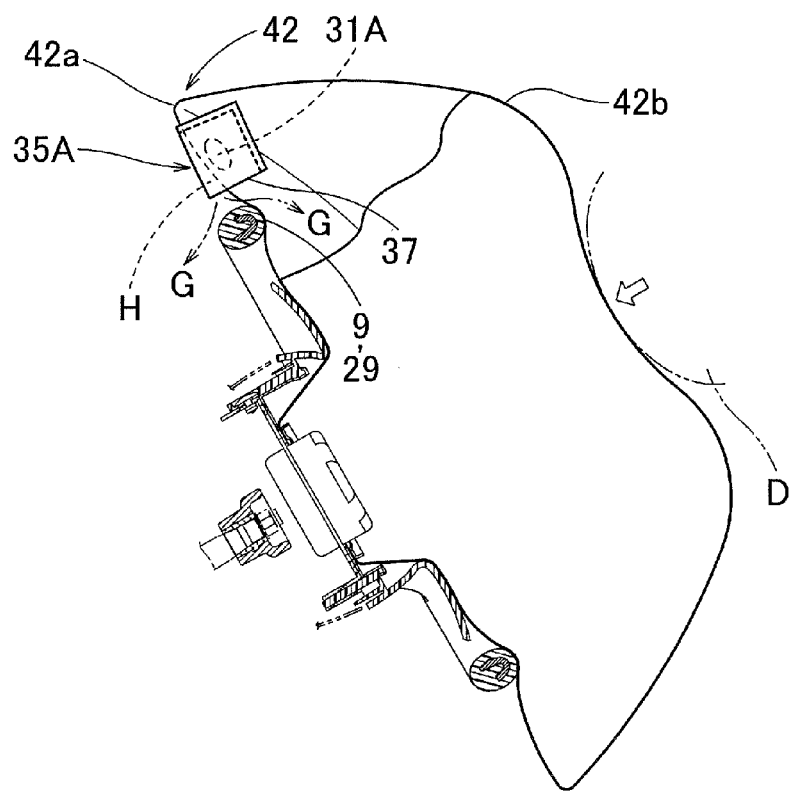

Similarly, in the airbag apparatus M2, when the airbag 20A finishes inflating, as shown in FIG. 9A, the patch 35A smoothly closes the vent holes 31A and 31A. Further, when the driver D is cushioned, as shown in FIG. 9B, the circumferential edge portion 33 of the vent holes 31A and 31A moves toward the driver D relatively to the patch 35A, simultaneously with operation of the reaction force-receiving contact portion 29 that is pressed and recessed by the reaction force-applying support portion 9. As a result, the gap H is generated between the patch 35A and the circumferential edge portion 33, the vent holes 31A and 31A are opened, and the inflation gas G is smoothly discharged, such that it is possible to achieve the same operation and effect as those of the first embodiment.

Figure 10A:
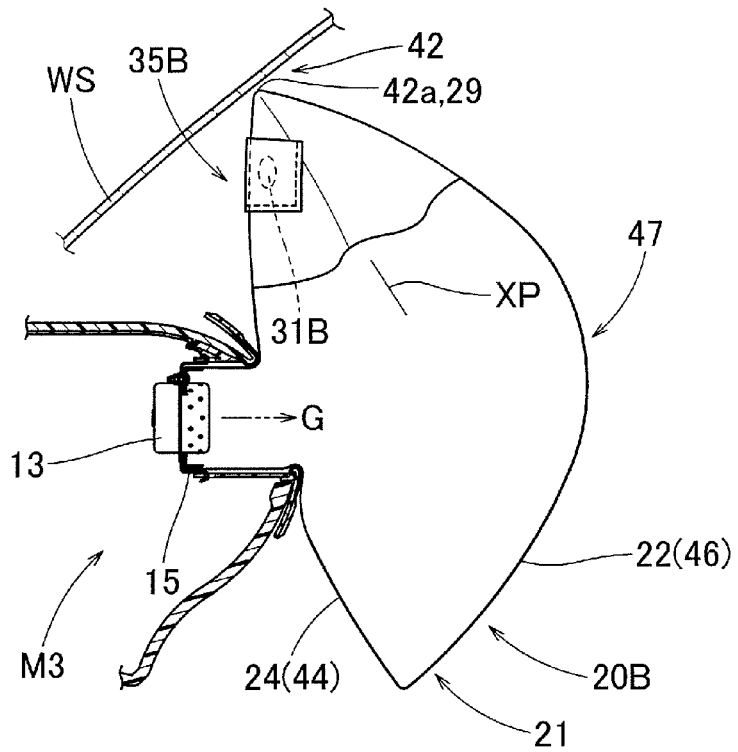
FIGS. 10A and 10B are views sequentially illustrating when an airbag apparatus according to a third embodiment operates.
Figure 10B:
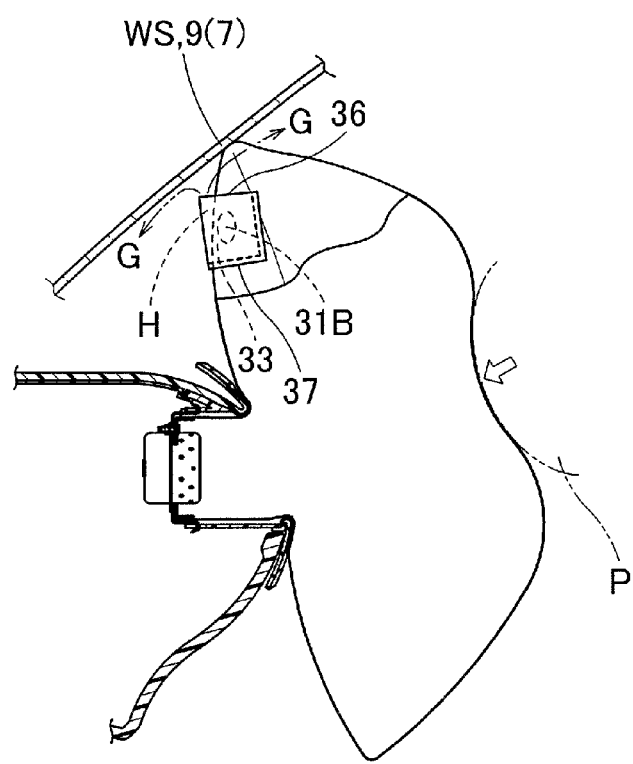

Further, although the airbag apparatus M1 and M2 for a driver's seat were described in the first and second embodiments, an airbag apparatus M3 for an occupant seat shown in FIGS. 10A and 10B may be implemented.

In the airbag apparatus M3, an inflating airbag 20B has a substantially four-sided pyramid shape that is the same as those of the airbags 20 and 20A of the first and second embodiments. Further, the airbag 20B has vent holes 31B and 31B and a patch 35B at the vehicle body side wall 24 of the front protrusion 42. Further, in the airbag apparatus M3, the reaction force-applying support portion 9 of the vehicle body structure 7 is a windshield WS and the reaction force-receiving contact portion 29 is the front end 42a of the protrusion 42.

Further, the reaction force-applying support portion 9 that is the windshield WS also relatively and partially presses only a portion of the vehicle body side wall 24, that is, a portion around the front end 42a of the protrusion 42 (the reaction force-receiving contact portion 29), as a passenger (the occupant in the passenger seat) P presses the airbag 20B, as in the first and second embodiments. In other words, the reaction force-applying support portion 9 that is the windshield WS does not press the area where the patch 35B or the vent hole 31B is disposed even if the passenger (the occupant in the passenger seat) D hits against the airbag 20B, as in the first and second embodiments.

Similarly, in the airbag apparatus M3, when the airbag 20B finishes inflating, as shown in FIG. 10A, the patch 35B smoothly closes the vent holes 31B and 31B. Further, when the occupant P is cushioned, as shown in FIG. 10B, the circumferential edge portion 33 of the vent holes 31B and 31B is moved back behind the occupant P relatively to the patch 35B, simultaneously with the operation of the reaction force-receiving contact portion 29 that is pressed and recessed by the reacting force-applying support portion 9. Therefore, the gap H is generated between the patch 35B and the circumferential edge portion 33, the vent holes 31B and 31B are opened, and the inflation gas G is smoothly discharged, such that it is possible to achieve the same operation and effect as those of the first and second embodiments.

Figure 11A:
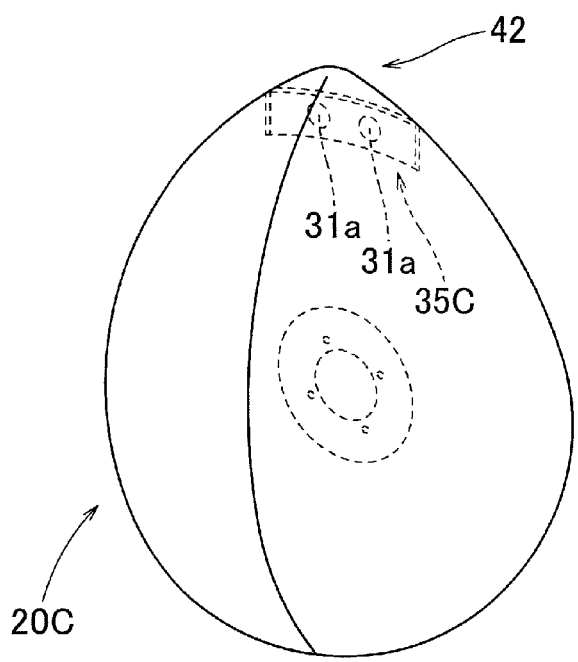
FIG. 11A is a perspective view seen from a side of a restraining wall and FIG. 11B is a perspective view seen from a side of a vehicle body side wall.
Figure 11B:
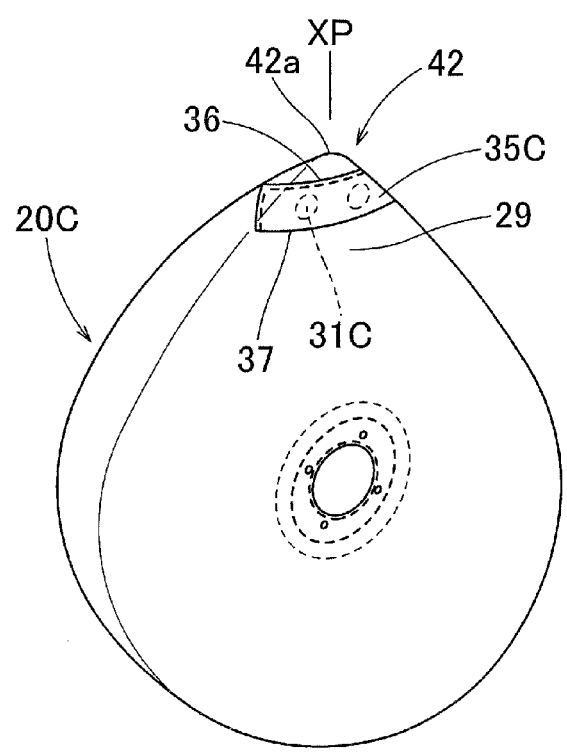

Further, when the airbags 20, 20A, and 20B that finish inflating have substantially four-sided pyramid shapes was described in the embodiments. However, similar to an airbag 20C shown in FIGS. 11A and 11B, one protrusion 42 that protrudes in a conical shape may be disposed and a vent hole 31C or a patch 35C may be disposed at the portion of the vehicle body side wall 24 of the protrusion 42.

Further, when the reaction force-receiving contact portion 29 is not in contact with the reaction force-applying support portion 9 before the occupant is cushioned after the airbags 20, 20A, and 20B finish inflating was described in the embodiments. However, the airbag 20 or the vehicle body structure 7 may be implemented such that the reaction force-receiving contact portion 29 is in contact with the reaction force-applying support portion 9, unless the inflation gas G is discharged from the vent holes 31, 31A, and 31B before the occupant is cushioned after the inflation is finished.

Further, in the embodiments, the patches 35, 35A, 35B, and 35C connect both edges 38 and 39 opposite to the circumferential direction about the axial center XP of the protrusion 42 to the outer circumferential walls 21 of the airbags 20, 20A, 20B, and 20C. Further, the patches 35, 35A, 35B, and 35C also connect the edge spaced from the reaction force-receiving contact portion 29 to the outer circumferential wall 21. However, the edges (the rear edges 37 of the patches 35 and 35B and the front edges 36 of the patches 35A and 35C) spaced from the reaction force-receiving contact portion 29 of the patches 35, 35A, 35B, and 35C may not be connected to the outer circumferential wall 21, as long as the vent holes 31, 31A, 31B, and 31C can be smoothly closed.

Further, when the patches 35, 35A, 35B, and 35C have band shapes that are long in the circumferential direction about the axial center XP of the protrusion 42 was described in the embodiments. However, the patch may have an elliptical shape or a semicircular shape. Further, it is preferable for the patch to easily close a plurality of 2 0 vent holes arranged in parallel in the circumferential direction about the axial center XP of the conical protrusion 42 as long as it is shaped to be long in the circumferential direction about the axial center XP of the conical protrusion 42.

What is claimed is:

1. An airbag apparatus comprising:
   an airbag that is inflated by inflow of an inflation gas to cushion an occupant; and
   a vehicle body structure that supports the airbag receiving the occupant,
   wherein the airbag includes:
   an outer circumferential wall that has a restraining wall receiving the occupant and a vehicle body side wall supported by the vehicle body structure when the occupant is cushioned;
   a vent hole that is disposed at the vehicle body side wall and opened to discharge the inflation gas when the internal pressure increases;
   a patch that closes the vent hole; and
   a protrusion that has a conical shape with the front narrowed when inflation is finished, around the interface of the restraining wall and the vehicle body side wall;
   wherein the vehicle body structure has a reaction force-applying support portion that supports the protrusion and applies a reaction force substantially opposite to the approach direction of the occupant to the protrusion, when the airbag cushions the occupant after the airbag finishes inflating,
   wherein the protrusion has a reaction force-receiving contact portion that is in contact with the reaction force-applying support portion and is partially recessed toward the occupant approaching by receiving the reaction force,
   wherein the vent hole and the patch are disposed at the vehicle body side wall of the protrusion around the reaction force-receiving contact portion,
   wherein the vent hole is disposed along the axial center of the protrusion at a position where the vent hole is not pressed, in parallel with the reaction force-receiving contact portion, at the reaction force-applying support portion when the airbag cushions the occupant,
   wherein the patch disconnects the edge of the reaction force-receiving contact portion to be spaced from the vehicle body side wall, and connects at least both edges opposite to the circumferential direction about the axial center of the protrusion that protrudes in a conical shape to the outer circumferential wall of the airbag while developing and connecting the patch and the circumferential edge of the vent hole to overlap each other in a flat shape,
   wherein the patch is positioned to keep the vent hole closed before the occupant is cushioned after the airbag finishes inflating, and
   wherein the patch is disposed at a position where the region from the portion covering at least the vent hole to the edge of the reaction force-receiving contact portion is not pressed against the reaction force-applying support portion when the airbag cushions the occupant, and is spaced from the circumferential edge of the vent hole that moves as the reaction force-receiving contact portion is recessed when the occupant is cushioned.

2. The airbag apparatus according to claim 1, wherein the patch is connected to the outer circumferential wall of the airbag, with the length in the circumferential direction about the axial center of the protrusion larger than the length defined along the axial center of the protrusion, as a dimension of the region surrounded by the joint of the airbag to the outer circumferential wall.

3. The airbag apparatus according to claim 2, wherein a plurality of vent holes are disposed to be separated in the circumferential direction about the axial center of the protrusion.

4. The airbag apparatus according to claim 1, wherein, after inflation is finished, the airbag has a substantially four-sided pyramid shape in which the restraining wall is disposed at the top and the vehicle body side wall is disposed at a bottom portion, with at least one of four corners of the bottom portion of the substantially four-sided pyramid shape as the protrusion, where the reaction force-receiving contact portion, the vent hole, and the patch are disposed.

5. The airbag apparatus according to claim 1, wherein the vehicle body structure supporting the reaction force-receiving contact portion is a ring portion that is held by hands when a steering wheel is operated and the airbag is accommodated in a boss portion at the center of the steering wheel to be used for an airbag apparatus for a driver's seat.

6. The airbag apparatus according to claim 5, wherein the vent hole and the patch are disposed at the inside position of the ring portion adjacent to the reaction force-receiving contact portion.

7. The airbag apparatus according to claim 5, wherein the vent hole and the patch are disposed at the outside position of the ring portion adjacent to the reaction force-receiving contact portion.

8. The airbag apparatus according to claim 1, wherein the vehicle body structure supporting the reaction force-receiving contact portion is a windshield disposed in front of a passenger seat and the airbag is accommodated in an instrument panel in front of the passenger seat to be used for an airbag apparatus for a passenger seat.

9. The airbag apparatus according to claim 1, wherein the patch connects the edge opposite to the non-connected edge, and separated from a side of the reaction force-receiving contact portion, to the vehicle body side wall.

* * * * *